US010694098B2

(12) United States Patent
Kishimoto

(10) Patent No.: US 10,694,098 B2
(45) Date of Patent: Jun. 23, 2020

(54) APPARATUS DISPLAYING GUIDE FOR IMAGING DOCUMENT, STORAGE MEDIUM, AND INFORMATION PROCESSING METHOD

(71) Applicant: CANON KABUSHIKI KAISHA, Tokyo (JP)

(72) Inventor: Ryo Kishimoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/183,196

(22) Filed: Nov. 7, 2018

(65) Prior Publication Data

US 2019/0141237 A1 May 9, 2019

(30) Foreign Application Priority Data

Nov. 9, 2017 (JP) .................................. 2017-216670

(51) Int. Cl.
*H04N 5/232* (2006.01)
*G06T 7/13* (2017.01)
*G06T 7/60* (2017.01)

(52) U.S. Cl.
CPC ........... *H04N 5/23222* (2013.01); *G06T 7/13* (2017.01); *G06T 7/60* (2013.01); *H04N 5/232945* (2018.08); *G06T 2207/30176* (2013.01); *H04N 5/232935* (2018.08)

(58) Field of Classification Search
CPC ......... H04N 5/23222; H04N 5/232945; H04N 5/232935; G06T 7/60; G06T 7/13; G06T 2207/30176
See application file for complete search history.

(56) References Cited

U.S. PATENT DOCUMENTS 8,559,766 B2 * 10/2013 Tilt ........................ G06T 1/0007
348/211.2
2011/0157406 A1 * 6/2011 Tauchi ............... H04N 5/23293
348/222.1

FOREIGN PATENT DOCUMENTS

JP     2012-108720 A     6/2012
JP     2012108720 A  *  6/2012 ............. G06F 3/048

* cited by examiner

*Primary Examiner* — Nhan T Tran
(74) *Attorney, Agent, or Firm* — Canon U.S.A., Inc. I.P. Division

(57) ABSTRACT

An apparatus and method is provided that detects four sides of a subject image included in a captured image. It is determined, based on a width and a height of the captured image and the detected four sides of the subject image, whether imaging guides of vertical lines are to be displayed or imaging guides of horizontal lines are to be displayed. The vertical lines are displayed in a left end and a right end of a region in which the captured image is displayed when it is determined that the imaging guides of the vertical lines are to be displayed. The horizontal lines are displayed in an upper end and a lower end of the region in which the captured image is displayed when it is determined that the imaging guides of the horizontal lines are to be displayed.

16 Claims, 9 Drawing Sheets

FIG. 4

APPARATUS DISPLAYING GUIDE FOR IMAGING DOCUMENT, STORAGE MEDIUM, AND INFORMATION PROCESSING METHOD

BACKGROUND

Field

The present disclosure relates to an information processing apparatus, a program, and an information processing method for displaying a guide for obtaining an appropriate captured image when a subject, such as a document, is imaged.

Description of the Related Art

Mobile terminals with a built-in camera have been generally used. Under this situation, sales persons in insurance companies who have a mobile terminal with a built-in camera visit their customers and perform the following work. The sales persons capture images of documents, such as certificates of insurance of the customers, as subjects using the mobile terminals with a built-in camera, and use obtained document image data. Opportunity of such work is increased. For example, optical character recognition (OCR) process is performed on the obtained document image data to extract character data, and the character data is registered in a database or analyzed for suggestion of solutions. Therefore, resolution of the document image data obtained by a mobile terminal with a built-in camera is preferably as high as possible so that high recognition accuracy of the optical character recognition process is attained.

Japanese Patent Laid-Open No. 2012-108720 discloses a technique of displaying an ideal frame at a time of imaging so that appropriate imaging data of a document is obtained. In the technique of Japanese Patent Laid-Open No. 2012-108720, first, size data is stored in advance which represents the correspondence between a type of a document (a type, such as A4, B5, or a postcard type) and aspect ratio data of the document. Thereafter, edges of the document are detected from image data obtained by imaging the document using an imaging unit, and size data which is close to a ratio of the detected edges of the document is specified in the size data which is stored in advance. Then, the obtained image data is displayed, and in addition, an ideal frame indicating a position of the document in a case where the positional relationship between the imaging unit and the document is appropriate is displayed in accordance with the aspect ratio data of the specified size data. Thereafter, a timing when differences between distances of the edges of the document and distances of the ideal frame become equal to or smaller than a predetermined value is detected, the image data at this timing is corrected before being stored in a storage unit as saving image data.

However, in the technique of Japanese Patent Laid-Open No. 2012-108720, it is difficult to specify the most similar size data in a case where the aspect ratio of the document to be imaged is considerably different from any of the size data which is stored in advance. In this case, even if one of the size data stored in advance is determined to be similar, a size is considerably different. Therefore, even if a user adjusts an imaging position of the camera after that, differences in distances on all sides, that is, differences in distances between four sizes of the edges of the document and four sides of the ideal frame, do not become within a predetermined value. Specifically, even if the user changes an imaging distance between the camera and the document so that two of the sides (for example, horizontal two sides) of the edges of the document which face each other match two of the four sides of the displayed ideal frame (for example, horizontal two sides), the other two sides which are adjacent to the matched two sides of the document (for example, vertical two sides if the matching of the horizontal two sides is attained) are positioned considerably far from positions of the sides of the ideal frame since the aspect ratio of the ideal frame is different from that of the document. Accordingly, the user who is performing an operation may be confused. Furthermore, in a case where the timing when the differences of the distances between the edges of the document and the ideal frame becomes equal to or smaller than the predetermined value is used as an automatic saving condition (an automatic imaging condition), automatic saving of image data may not be performed since the differences in distances on all sides do not become equal to or smaller than the predetermined value.

SUMMARY OF THE INVENTION

According to an aspect of the disclosure, an apparatus includes a memory that stores a program, and a processor that executes the program that causes the apparatus to detect four-side information indicating four sides of a subject image included in a captured image, determine, based on a width and a height of the captured image and the four-side information of the subject image, whether imaging guides of vertical lines are to be displayed or imaging guides of horizontal lines are to be displayed, control display of the vertical lines in a left end and a right end of a region in which the captured image is displayed when it is determined that the imaging guides of the vertical lines are to be displayed, and control display of the horizontal lines in an upper end and a lower end of the region in which the captured image is displayed when it is determined that the imaging guides of the horizontal lines are to be displayed.

Further features will become apparent from the following description of exemplary embodiments with reference to the attached drawings.

BRIEF DESCRIPTION OF THE DRAWINGS

FIG. 4 is a diagram illustrating an example of a user interface (UI) of a mobile application.

DESCRIPTION OF THE EMBODIMENTS

Hereinafter, embodiments of the present disclosure will be described with reference to the accompanying drawings.

Note that the embodiments do not limit the present disclosure and it is not necessarily the case that all components described in the embodiments are required to solve problems of the present disclosure.

First Embodiment

A mobile terminal (a portable terminal) having a camera function will be described as an example of an information processing apparatus according to a first embodiment. The mobile terminal may be a terminal having a wireless communication function, such as a smartphone or a tablet terminal, and in this case, image data obtained by means of the wireless communication function may be transmitted to an external server or the like.

Figure 1:
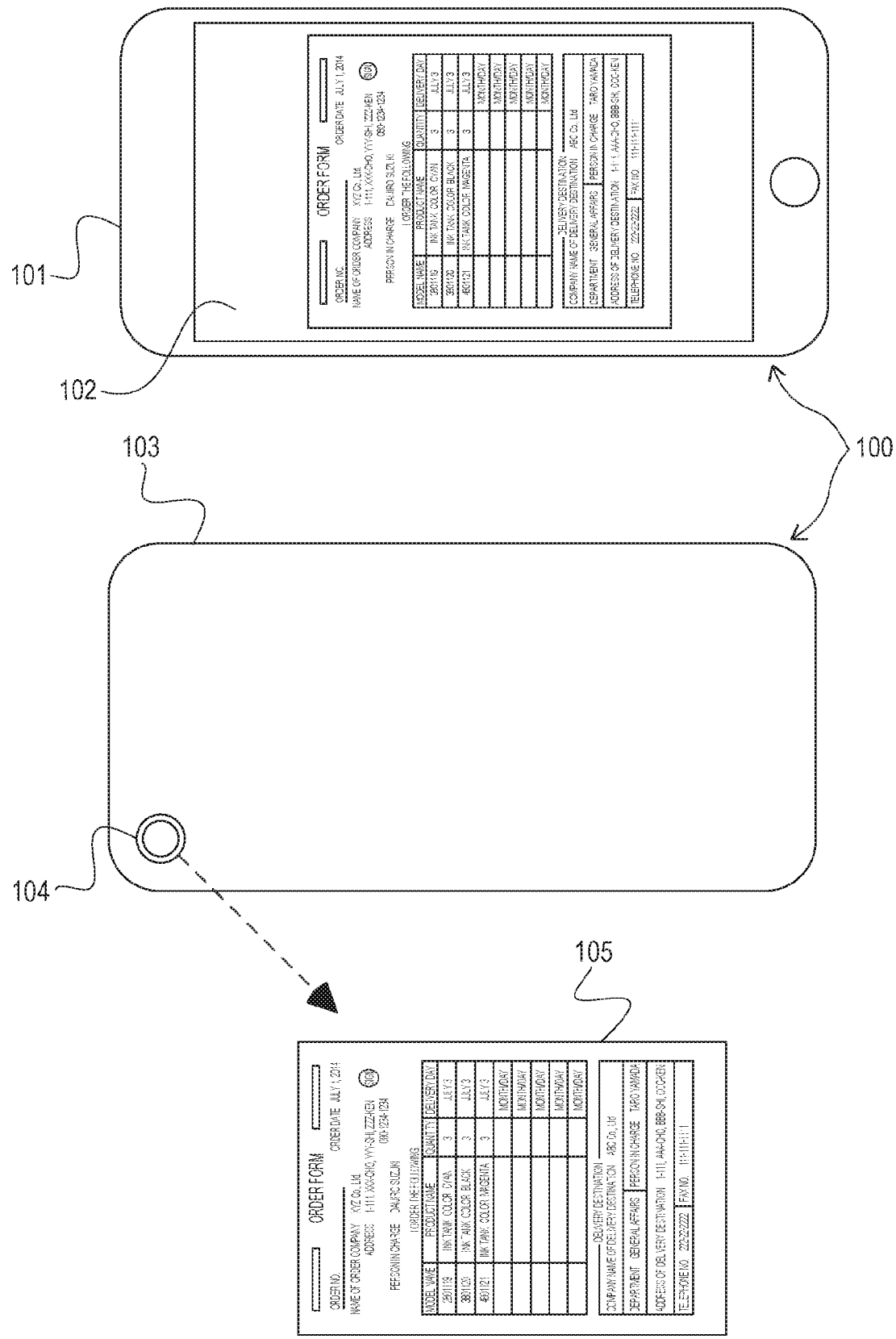
FIG. 1 is a diagram illustrating an example of appearance of a mobile terminal.

FIG. 1 is a diagram illustrating an example of appearance of a mobile terminal 100, that is, appearance viewed from a front surface 101 of the mobile terminal 100 and appearance viewed from a back surface 103. The front surface 101 of the mobile terminal includes a touch panel display (a display unit) 102 which has two functions, that is, a function of displaying an image being captured and a function of inputting an operation instruction performed by a user. The back surface 103 of the mobile terminal includes a camera 104 disposed thereon which obtains moving images and still images. In this embodiment, the user of the mobile terminal 100 may start a process by imaging a subject (a document, such as a business form) 105 using the camera 104 in a mobile application described below. The subject 105 is not limited to a paper document of a regular size, such as an A4 size and an A3 size, and may be a paper document of an irregular size. Furthermore, the subject 105 is not limited to a paper document, such as a business form, and may be a business card, a photograph, and a card of various sizes. The mobile application described below may obtain an image of the subject 105 using the camera 104 and output the image to the touch panel 102.

Hardware Configuration

Figure 2:
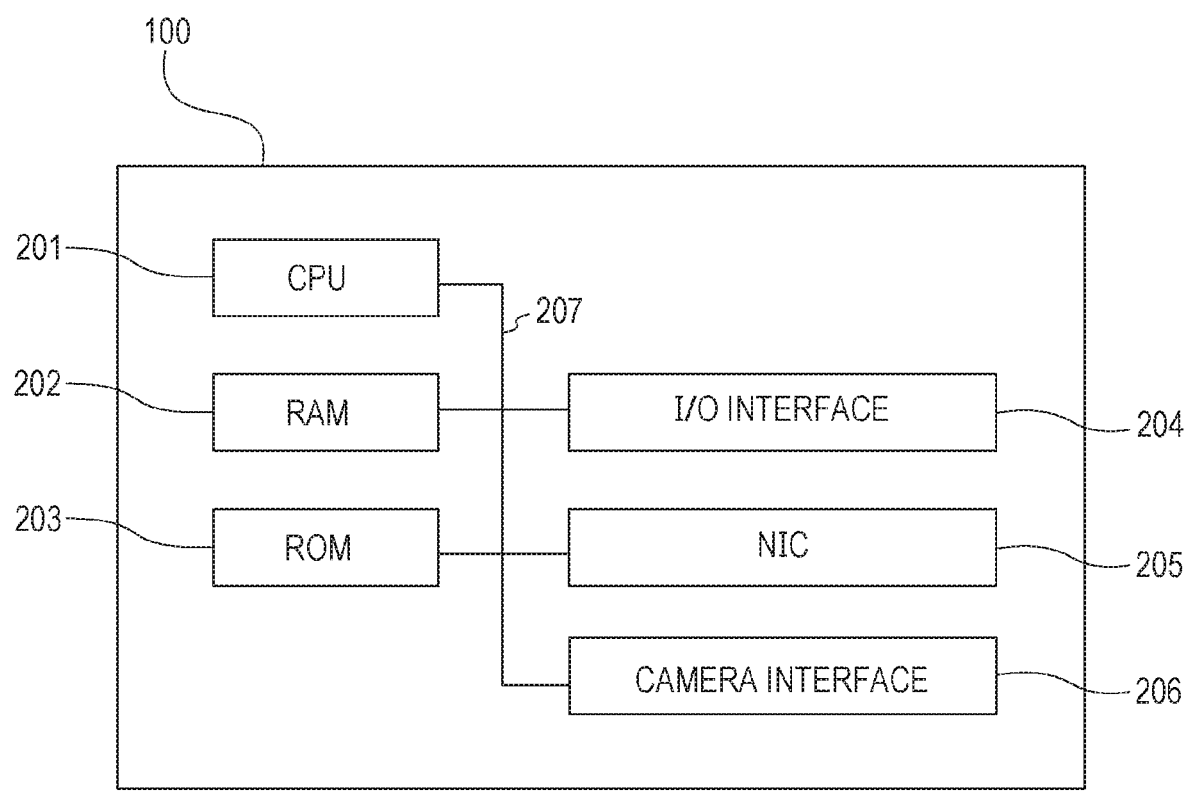
FIG. 2 is a diagram illustrating an example of a hardware configuration of the mobile terminal.

FIG. 2 is a diagram illustrating an example of a hardware configuration of the mobile terminal 100 which includes various units (201 to 207). A central processing unit (CPU) 201 is a processor functioning as a processing unit which realizes various processes of flowcharts described below by executing various programs. A random access memory (RAM) 202 stores various information and is used as a temporary work storage region of the CPU 201. A read only memory (ROM) 203 is a storage unit which stores various programs and the like. The CPU 201 loads programs stored in the ROM 203 into the RAM 202 and executes the programs. Note that a storage medium which stores the programs which realize the present disclosure is not limited to the ROM 203 and may be a computer readable storage medium, such as a flash memory including a universal serial bus (USB) memory, a hard disk drive (HDD), and a solid state drive (SSD). Furthermore, the programs are not limited to be stored in a storage medium of the mobile terminal 100 and may be downloaded through a wireless network at a time of execution or may be web applications to be executed on a web browser. Note that functions of the mobile terminal 100 and an entire or a portion of a process of a sequence described below may be realized by dedicated hardware.

An input/output interface 204 performs, communication with the touch panel 102, transmission of display data, reception of an operation instruction data from the user, and the like. A network interface card (NIC) 205 is a unit used to connect the mobile terminal 100 to a network (not illustrated) through wireless communication or the like.

A camera interface 206 is used to obtain image data of the subject 105 captured by the camera 104. The units described above are capable of performing transmission and reception of data through a bus 207.

Software Configuration

Figure 3:
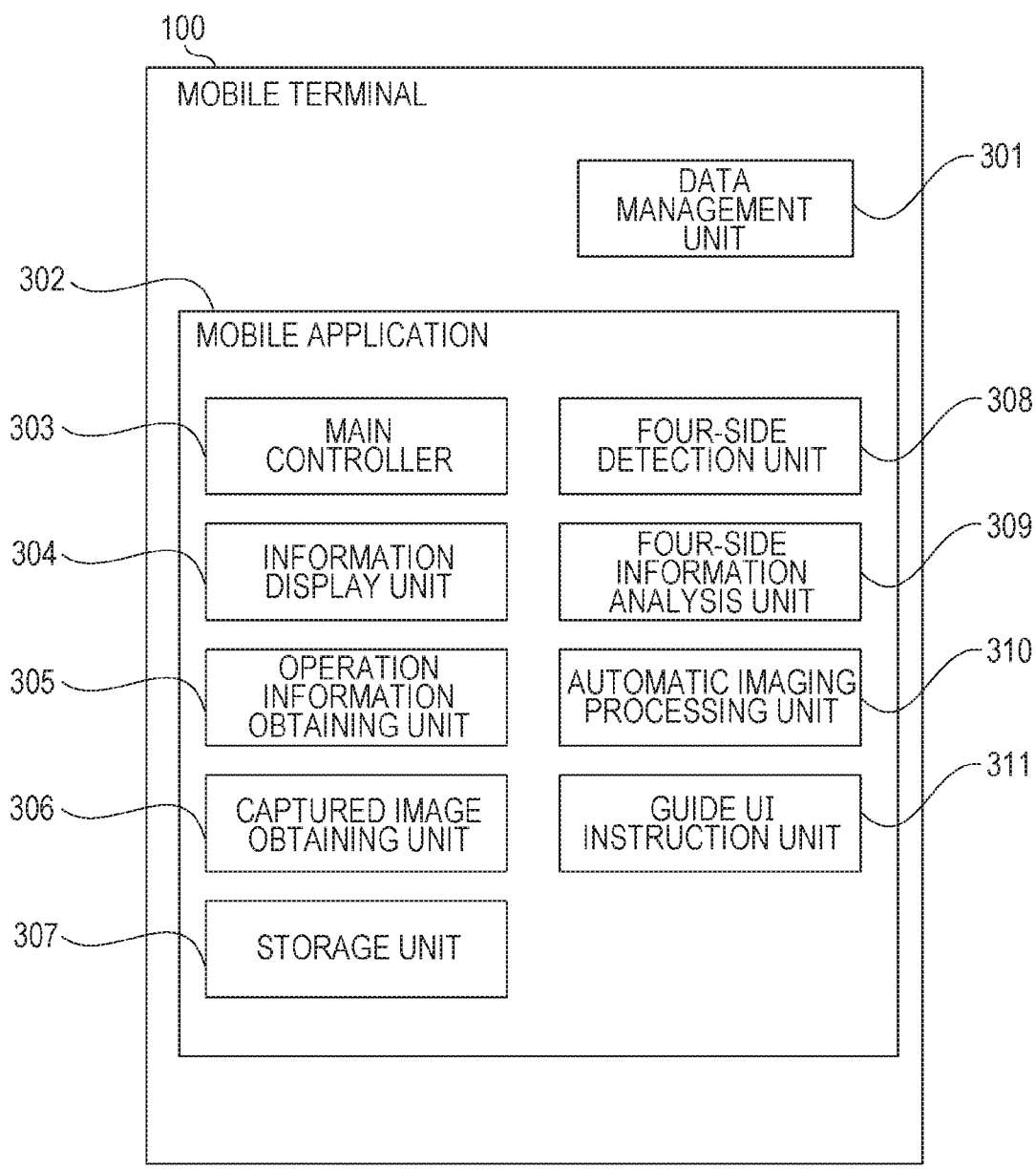
FIG. 3 is a diagram illustrating an example of a software configuration of the mobile terminal.

Next, an example of a configuration of a functional module of software (a mobile application) of the mobile terminal 100 will be described with reference to FIG. 3. Programs which realize various processing units illustrated in FIG. 3 are stored in the ROM 203 and the like as described above.

An operating system (OS) (not illustrated) of the mobile terminal 100 includes a data management unit 301. The data management unit 301 manages images and application data. The OS is provided with a control application programming interface (API) which enables use of the data management unit 301. A mobile application 302 obtains and stores the images and the application data managed by the data management unit 301 by utilizing the control API.

The mobile application 302 is executable in the mobile terminal 100. The mobile application 302 performs various data processes on image data of the subject 105 obtained through the camera interface 206.

A main controller 303 controls various modules (303 to 311) included in the mobile application 302.

Figure 4:
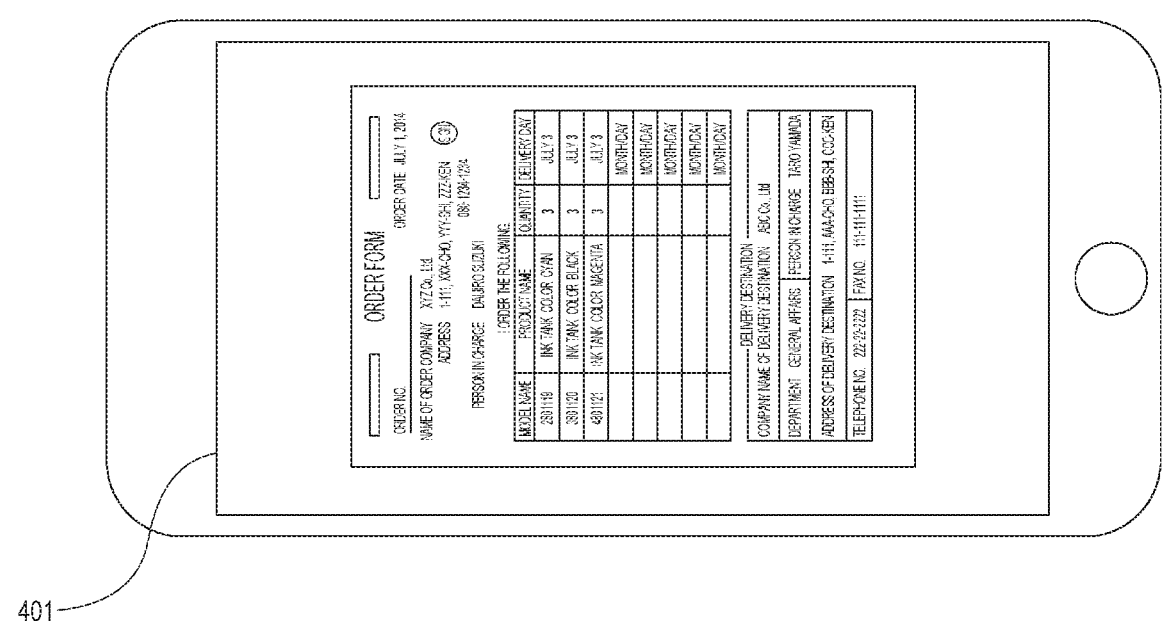

An information display unit 304 displays user interfaces (UIs) of the mobile application 302 for the user in accordance with instructions issued by the main controller 303. FIG. 4 is a diagram illustrating a UI screen 401 provided by the mobile application 302. The screen 401 of the mobile terminal is displayed in the touch panel 102 of the mobile terminal 100, displays an image being captured using the camera 104, and receives an operation performed by the user (user operation) on a displayed image or the like through the displayed UIs. Note that a form of the UI screen (display positions, sizes, ranges, arrangement, display content, and the like of a captured image, operation buttons, and the like) provided by the mobile application 302 is not limited to the form illustrated in FIG. 4, and any appropriate configuration may be employed as long as functions of the mobile application 302 are realized.

An operation information obtaining unit 305 obtains information on the user operation performed on the UI screen displayed by the information display unit 304 and transmits the obtained operation information to the main controller 303. When the user touches the UI screen, for example, the operation information obtaining unit 305 detects information on a touched position on the screen and transmits the information on the detected position to the main controller 303.

A captured image obtaining unit 306 obtains an image captured by the camera 104 through the camera interface 206 in accordance with an instruction issued by the main controller 303 and stores the captured image in a storage unit 307. When the captured image is to be immediately processed, the captured image obtaining unit 306 may directly transmit the captured image to the main controller 303 or a four-side detection unit 308. Furthermore, the captured image obtaining unit 306 obtains image resolution at a time of the imaging and transmits the image resolution to the main controller 303.

The storage unit 307 stores captured images obtained by the captured image obtaining unit 306. The storage unit 307 further performs deletion of the captured images which have been stored in accordance with an instruction issued by the main controller 303.

The four-side detection unit 308 performs an edge detection process and the like on the image obtained by the captured image obtaining unit 306 and stored in the storage unit 307 to obtain information on four sides (paper edges) of the document included in the image. The four-side information includes position coordinates in the captured image which correspond to four apices of a quadrangle constituted by boundaries between the document in the captured image and a background. A straight line detection method, such as a Hough transform, an edge detection method, such as a Canny algorithm, and the like may be used in combination for detection of the four-side information. However, a detection method which outputs a detection result which is not affected by a change of brightness due to natural light or noise caused by the background of the document is preferably used taking imaging under various environments into consideration.

A four-side information analysis unit 309 obtains information on a shape of the document, such as lengths of the sides of the document, an estimation value of an aspect ratio of the document, long sides, and short sides based on the four-side information detected by the four-side detection unit 308. Furthermore, the four-side information analysis unit 309 performs a process of determining a guide display direction based on the four-side information (the position coordinates of the four apices) detected by the four-side detection unit 308. The process of determining the guide display direction is performed to determine whether horizontal straight lines are used or horizontal straight lines are used for the imaging guides to be displayed in an overlapping manner on a live-view image displayed in real time in the imaging of the subject. The process of determining the guide display direction is performed by comparing an aspect ratio of the captured image with an aspect ratio of the four sides of the document. Specifically, assuming that a width of the captured image is denoted by W, a height is denoted by H, a width of a subject image analyzed based on the four-side information detected by the four-side detection unit 308 is denoted by w, and a height is denoted by h, it is determined whether the following expression is satisfied.

$$(h/w) > (H/W)$$  Conditional Expression (1)

Note that the width w of the subject image may be calculated based on lengths of two of the four sides of the quadrangle detected by the four-side detection unit 308 which have inclinations closer to a horizontal direction, and the height h of the subject image may be calculated based on lengths of the other two of the four sides of the detected quadrangle which have inclinations closer to a vertical direction.

When it is determined that the condition equation (1) is satisfied (that is, it is determined that the aspect ratio of the subject image is larger as a result of the comparison between the aspect ratio of the subject image and the aspect ratio of the captured image), it is determined that horizontal straight lines are to be displayed in an overlapping manner in two portions, that is, a portion in the vicinity of an upper end of a captured image display region and a portion in the vicinity of a lower end of the region as imaging guides. Specifically, when it is determined that the ratio of the subject image indicates an image vertically longer than the captured image, horizontal straight lines are displayed in an overlapping manner in two portions, that is, upper and lower end of the screen as imaging guides. In this case, the user may capture an image of the document so that the document is not protruded from the captured image when adjusting an imaging position of the camera such that the two sides, that is, upper and lower sides of the subject image, match the horizontal two sides which are displayed in the overlapping manner in the screen as the imaging guides. Note that the imaging guides may be displayed in contact with left and right ends of the region where the captured image is displayed or displayed in positions inside ends of the region where the captured image is displayed by a predetermined distance (a predetermined number of pixels, such as five pixels, for example) in an overlapping manner.

On the other hand, when it is determined that the conditional expression (1) is not satisfied, it is determined that vertical straight lines are to be displayed in an overlapping manner in two portions, that is, a portion in the vicinity of a left end of the captured image display region and a portion in the vicinity of a right end of the region as imaging guides. Specifically, when it is determined that the aspect ratio of the subject image indicates an image horizontally longer than the captured image, vertical straight lines are displayed in an overlapping manner in two portions, that is, left and right ends of the screen as imaging guides. In this case, the user may capture an image of the document so that the document is not protruded from the captured image when adjusting an imaging position of the camera such that the two sides, that is, left and right sides of the subject image, match the vertical two sides which are displayed in the overlapping manner in the screen as the imaging guides. Note that the imaging guides may be displayed in contact with upper and lower ends of the region where the captured image is displayed or displayed in positions inside ends of the region where the captured image is displayed by a predetermined distance (a predetermined number of pixels, such as five pixels, for example) in an overlapping manner.

A guide UI instruction unit 311 generates an instruction for rendering an imaging guide UI for the overlapping display based on a result of the determination made in the guide display direction determination process performed by the four-side information analysis unit 309 and instructs the information display unit 304 to display a guide UI on a live-view image in an overlapping manner through the main controller 303. Note that it is preferable that lines of the imaging guides are displayed by color which is easily recognized by the user (such as red), and the straight lines of the imaging guides may be solid lines, broken lines, or dotted lines. A display example of the imaging guide UI will be described with reference to FIGS. 5 and 6.

Figure 5:
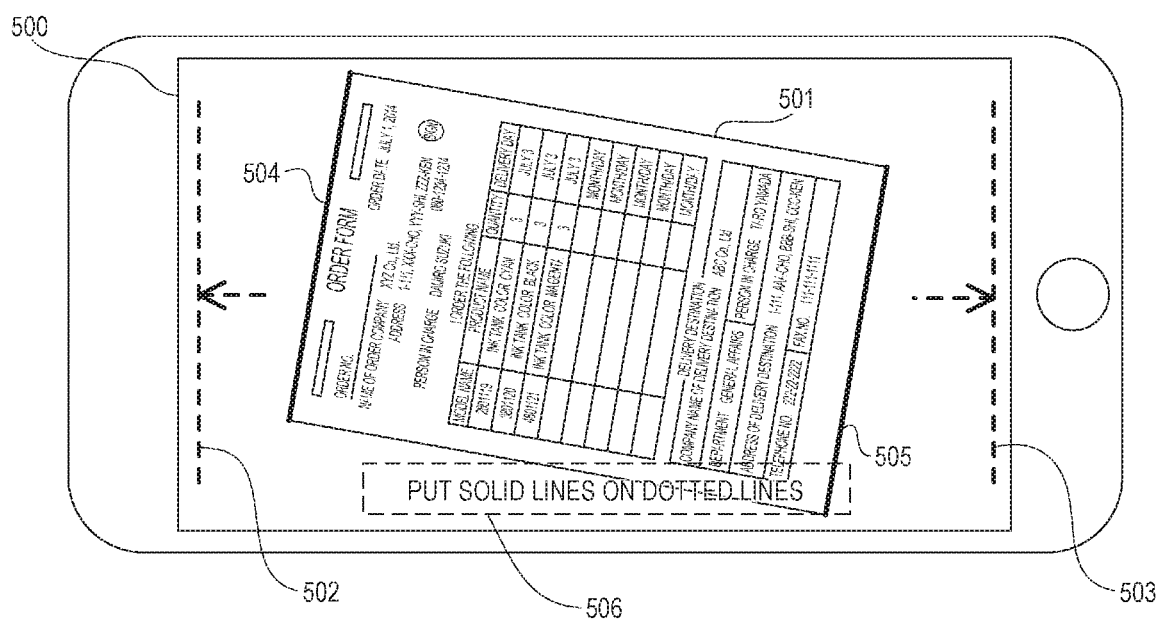
FIG. 5 is a diagram illustrating an example of a case where two straight lines extending in a vertical direction are displayed as imaging guides.

FIG. 5 is a diagram illustrating an example of display in a case where the four-side information analysis unit 309 determines that two vertical straight lines (502 and 503) are to be displayed in an overlapping manner in two portions, that is, in a portion in the vicinity of a left end of a display screen 500 and a portion in the vicinity of a right end of the display screen 500 as imaging guides based on four-side information of a subject image 501 detected by the four-side detection unit 308. A captured image is displayed as a live-view image in the display screen 500, and imaging guides UI (502 to 506) are displayed on the captured image in an overlapping manner. Specifically, when it is determined that an aspect ratio of the subject image indicates an image horizontally longer than the captured image, straight broken lines 502 and 503 are displayed in a vertical direction in a portion in the vicinity of a left end and a portion in the vicinity of a right end of the display screen as imaging guides as illustrated in FIG. 5. In this case, the two sides 504 and 505 in the four sides detected by the four-side detection unit 308 which are close to the vertical direction (the left and right sides of the subject image) are displayed by solid lines in an emphasis manner, and a guide message 506 which prompts the user to move an imaging position of the mobile terminal such that the sides 504 and 505 which are displayed in the emphasis manner match positions of the broken lines 502 and 503 in the vertical direction displayed as the guides is displayed. In this case, it is preferable that arrow marks are simultaneously displayed as illustrated in FIG. 5 so that the relationship between the sides of the quadrangle and the guides to match is easily recognized. Since the aspect ratio of the subject image indicates that the subject image is horizontally longer than the captured image, the subject image may be captured without protruding from the captured image when the left and right sides of the subject image match the imaging guides of the vertical lines. Note that the imaging guide UI 502 to 506 are displayed only when all four apices of the quadrangle of the subject image 501 are included in the captured image, and otherwise, the mobile terminal is too close to the subject, and therefore, it is preferable that a guide message prompting the user to move the mobile terminal far from the subject at a time of imaging is displayed.

Figure 6:
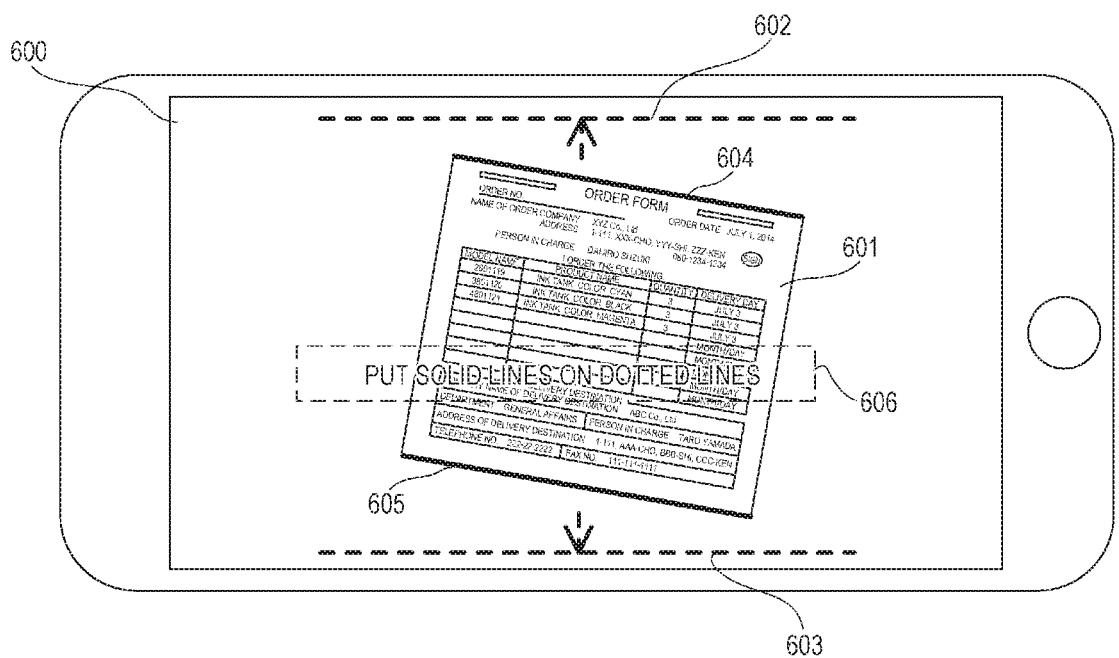
FIG. 6 is a diagram illustrating an example of a case where two straight line extending in a horizontal direction are displayed as imaging guides.

FIG. 6 is a diagram illustrating an example of display in a case where the four-side information analysis unit 309 determines that two horizontal straight lines (602 and 603) are to be displayed in an overlapping manner in two portions, that is, in a portion in the vicinity of an upper end of a display screen 600 and a portion in the vicinity of a lower end of the display screen 600 as imaging guides based on four-side information of a subject image 601 detected by the four-side detection unit 308. A captured image is displayed as a live-view image in the display screen 600, and imaging guides UI (602 to 606) are displayed on the captured image in an overlapping manner. In this case, the two sides 604 and 605 in the four sides detected by the four-side detection unit 308 which are close to the horizontal direction (the upper and lower sides of the subject image) are displayed by solid lines in an emphasis manner, and a guide message 606 which prompts the user to move an imaging position of the mobile terminal such that the sides 604 and 605 which are displayed in the emphasis manner match positions of the broken lines 602 and 603 in the horizontal direction displayed as the guides is displayed. In this case, it is preferable that arrow marks are simultaneously displayed as illustrated in FIG. 6 so that the relationship between the sides of the quadrangle and the guides to match is easily recognized. Since the aspect ratio of the subject image indicates that the subject image is vertically longer than the captured image, the subject image may be captured without protruding from the captured image when the upper and lower sides of the subject image match the imaging guides of the horizontal lines. Note that the imaging guide UI 602 to 606 are displayed only when all four apices of the quadrangle of the subject image 601 are included in the captured image, and otherwise, the mobile terminal is too close to the subject, and therefore, it is preferable that a guide message prompting the user to move the mobile terminal far from the subject at a time of imaging is displayed.

An automatic imaging processing unit 310 determines whether a predetermined automatic imaging condition is satisfied based on the four-side information and automatically stores the captured image at a time when the automatic imaging condition is satisfied in the storage unit 307. Note that the captured image to be stored in the storage unit may be a still image extracted from a moving image obtained by imaging performed by the camera or a still image having the maximum number of pixels for imaging performed by the camera 104 by operating an electronic shutter (or a mechanical shutter) at the time when it is determined that the imaging condition is satisfied.

As the automatic imaging condition, the following condition may be set, for example. First, it is assumed that a width of the captured image is denoted by W, a height is denoted by H, lengths of two sides which extend in directions close to a horizontal direction which are obtained based on the four-side information of the subject image are denoted by w1 and w2, and lengths of two sides which extend in directions close to a vertical direction are denoted by h1 and h2. In this case, a ratio of the lengths of the horizontal two sides of the subject image to a width of the captured image is compared with a predetermined threshold value α, and a ratio of lengths of the two sides of the subject image in the vertical direction to a height of the captured image is compared with the predetermined threshold value α. The predetermined threshold value α is 0.95, for example. In this case, if a condition in which the apices of the quadrangle are included in the captured image and at least one of the following conditional expressions (2) and (3) is satisfied, it is determined that the automatic imaging condition is satisfied.

$(w1/W)>\alpha \&\& (w2/W)>\alpha$      Conditional Expression (2)

$(h1/H)>\alpha \&\& (h2/H)>\alpha$      Conditional Expression (3)

Note that a condition in which an inclination of the subject image is small in the captured image may be added to the imaging conditions. In this case, it is determined whether each of the sides extends in the horizontal direction or the vertical direction by comparing position coordinates of the apices of the quadrangle of the subject image with one another.

Furthermore, although both of the conditional expressions (2) and (3) may be determined at any time as described above, only one of the conditional expressions (2) and (3) may be determined based on a display direction if it has been determined whether the straight lines of the imaging guides are to extend in the horizontal direction or the vertical direction. For example, in a case where the broken lines 502 and 503 extending in the vertical direction are displayed as illustrated in FIG. 5, it is determined whether the condition in which all the apices of the quadrangle are included in the captured image and the conditional expression (2) are satisfied, and a determination of the conditional expression (3) may be skipped. In a case where the broken lines 602 and 603 extending in the horizontal direction are displayed as illustrated in FIG. 6, it is determined whether the condition in which all the apices of the quadrangle are included in the captured image and the conditional expression (3) are satisfied, and a determination of the conditional expression (2) may be skipped.

Processing Flow

Figure 7:
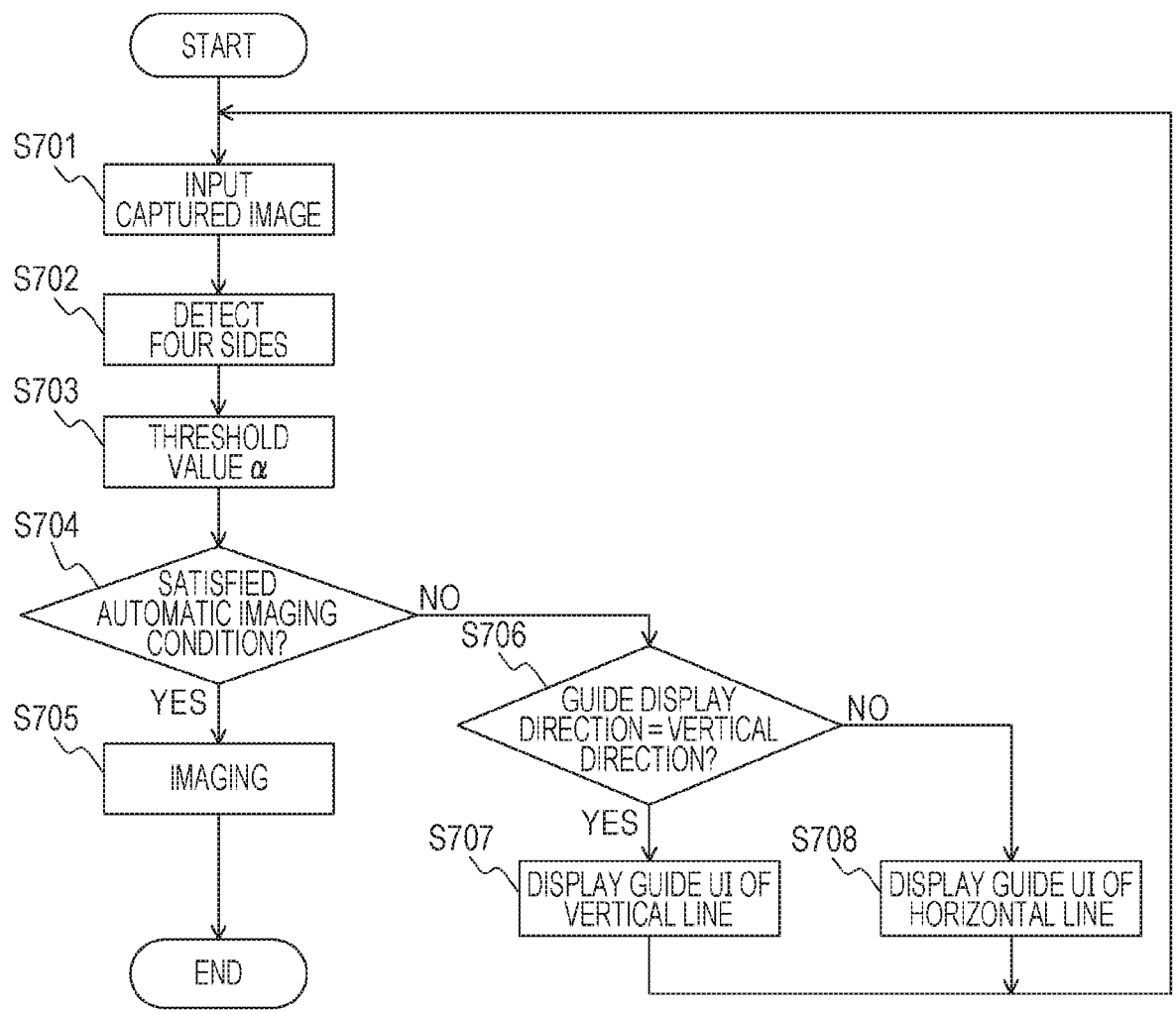
FIG. 7 is a processing flow according to a first embodiment.

A processing flow of the first embodiment of the present disclosure executed by the mobile application 302 of the mobile terminal 100 will be described with reference to FIG. 7. This flow is started when the mobile application 302 of the mobile terminal 100 is activated by a user operation.

In step S701, the main controller 303 receives data of a currently-captured image (moving image data) obtained by the captured image obtaining unit 306.

In step S702, the main controller 303 instructs the four-side detection unit 308 to perform a four-side detection process on the captured image obtained by the captured image obtaining unit 306 so as to obtain four-side information.

In step S703, the main controller 303 calls the automatic imaging conditions (conditional expressions, a threshold value α, and the like) to be used for the determination of the automatic imaging condition in step S704.

In step S704, the main controller 303 instructs an automatic imaging processing unit 310 to execute a process of determining whether the automatic imaging condition described above is satisfied. When it is determined that the automatic imaging condition is satisfied, (that is, automatic imaging is to be performed), the process proceeds to step S705, and otherwise, the process proceeds to step S706.

In step S705, the main controller 303 instructs the automatic imaging processing unit 310 to perform automatic imaging, and the automatic imaging processing unit 310 stores captured image data at this timing in the storage unit. Note that, in a case where the mobile application 302 executes the OCR process on the captured image data and also the process of obtaining a character recognition result, the main controller 303 further instructs an OCR processor (not illustrated) to execute the OCR process on the stored captured image data.

In step S706, the main controller 303 instructs the four-side information analysis unit 309 to analyze the four-side information obtained in step S702 so as to determine a guide display direction. As a result of the guide display direction determination process performed by the four-side information analysis unit 309, when it is determined that vertical guide lines are to be displayed, the process proceeds to step S707, and otherwise, the process proceeds to step S708.

In step S707, the main controller 303 causes the guide UI instruction unit 311 to generate a rendering instruction for displaying the vertical guide lines and display the display guides of the vertical lines 502 and 503 of FIG. 5 through the information display unit 304 in the live-view screen in an overlapping manner, and thereafter, the process returns to step S701.

In step S708, the main controller 303 causes the guide UI instruction unit 311 to generate a rendering instruction for displaying the horizontal guide lines and display the display guides of the horizontal lines 602 and 603 of FIG. 6 through the information display unit 304 in the live-view screen in an overlapping manner, and thereafter, the process proceeds to step S701.

Note that, although the display of the vertical guide lines and the horizontal guide lines is described in the flow described above, when it is determined that the automatic imaging condition is not satisfied since four-apices of the quadrangle are not included in the captured image after the automatic imaging condition is determined in step S704, a process of displaying a message indicating that the mobile terminal is to be moved far from the subject may be added.

According to the first embodiment, a guide UI which is easily recognized by the user may be displayed for imaging of a subject image of high resolution. Specifically, the imaging guides for capturing a document in an appropriate size may be provided for the user in a comprehensible manner without storing size data of the document in advance as disclosed in Japanese Patent Laid-Open No. 2012-108720.

Second Embodiment

In a second embodiment, an example in which a process of determining whether a subject image of higher resolution may be captured by rotating a subject being captured by 90 degrees is additionally performed will be described.

Figure 9:
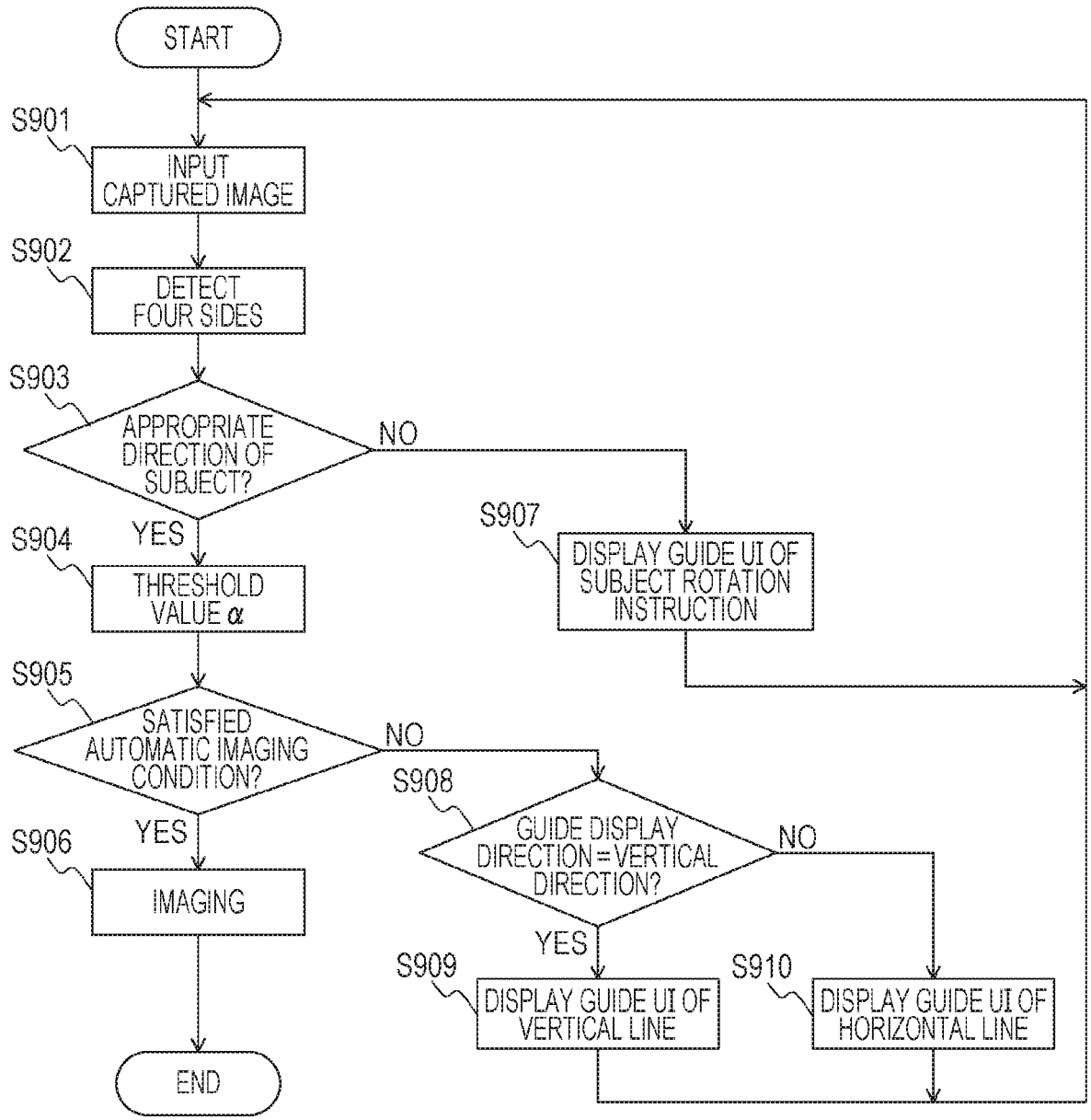
FIG. 9 is a processing flow according to a second embodiment.

A processing flow of the second embodiment of the present disclosure executed by a mobile application 302 of a mobile terminal 100 will be described with reference to FIG. 9.

In step S901, a main controller 303 receives data of a currently-captured image (moving image data) obtained by a captured image obtaining unit 306.

In step S902, the main controller 303 instructs a four-side detection unit 308 to perform a four-side detection process on the captured image obtained by the captured image obtaining unit 306 so as to obtain four-side information.

In step S903, the main controller 303 instructs a four-side information analysis unit 309 to determine whether a current direction of the subject is appropriate based on the subject image in the captured image. When the determination is affirmative, the process proceeds to step S904, and otherwise, the process proceeds to step S907.

The process of determining whether the subject direction is appropriate performed for determining the appropriate direction of the subject is performed by the four-side information analysis unit 309.

Assuming that a width of the captured image is denoted by W, a height is denoted by H, a width of the subject image included in the captured image is denoted by w, and a height is denoted by h, when one of the following conditional expressions (4) and (5) is satisfied, it is determined that the current subject direction is appropriate.

$(H/W)>1 \&\& (h/w) \geq 1$   Conditional Expression (4)

$(H/W)>1 \&\& (h/w) \leq 1$   Conditional Expression (5)

Note that, in a case where the width W and the height H of the captured image are the same (square), the lengths are not changed even when the subject is rotated, and therefore, the determination process in step S903 may not be performed.

Furthermore, if the subject image included in the captured image is inclined or if the subject image has distortion since the subject is imaged in an oblique direction, the determination is made using a width and a height of a circumscribed rectangle or an inscribed rectangle of the subject image instead, or using a rectangle obtained after an aspect ratio of the subject is estimated and distortion correction is performed.

In step S904, the main controller 303 calls the automatic imaging condition (the conditional expressions, the threshold value α, and the like) to be used for a determination of the automatic imaging condition performed in step S905.

In step S905, the main controller 303 instructs an automatic imaging processing unit 310 to execute a process of determining whether the automatic imaging condition illustrated in the first embodiment is satisfied. When it is determined that the automatic imaging condition is satisfied (that is, automatic imaging is to be performed), the process proceeds to step S906, and otherwise, the process proceeds to step S908.

In step S906, the main controller 303 instructs the automatic imaging processing unit 310 to perform automatic imaging, and the automatic imaging processing unit 310 stores captured image data at this timing in the storage unit. Note that, in a case where the mobile application 302 executes the OCR process on the captured image data and also the process of obtaining a character recognition result, the main controller 303 further instructs an OCR processor (not illustrated) to execute the OCR process on the stored captured image.

Figure 8:
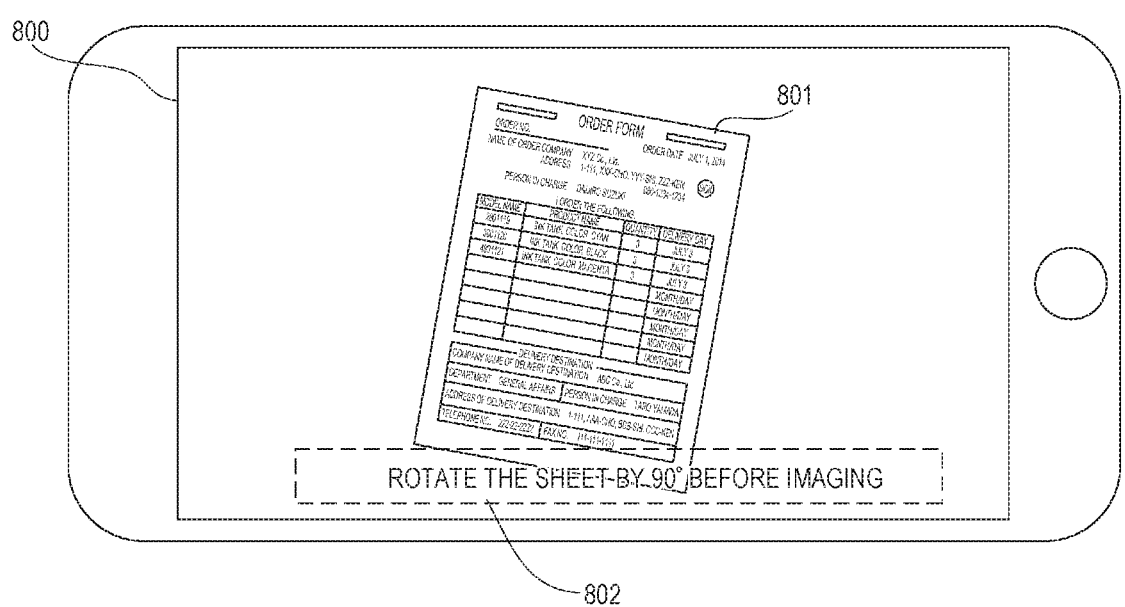
FIG. 8 is a diagram illustrating an example of an imaging guide UI indicating an instruction for rotation.

In step S907, the main controller 303 instructs the guide UI instruction unit 311 to display a guide UI for instructing rotation as illustrated in a mobile terminal screen 800 of FIG. 8, and thereafter, the process proceeds to step S901.

The mobile terminal screen 800 in FIG. 8 is a display example of the guide UI displayed in a case where it is determined that a current direction of the subject is not appropriate in step S903 (that is, in a case where it is determined that the subject may be imaged with higher resolution when the subject is rotated by 90 degrees). A message 802 is displayed on a live-view image in an overlapping manner as an imaging guide on the mobile terminal screen 800. The message 802 is displayed only when all the apices of the quadrangle of a subject image 801 are included in the captured image. The message 802 is displayed to prompt the user to image the subject (a sheet) after the subject is rotated by 90 degrees. In the case of FIG. 8, an image of higher resolution may be obtained by turning the subject sideways, and therefore, a message indicating this information is displayed. Note that, although the message indicating that the subject is to be rotated is displayed in this embodiment, a message prompting the user to perform imaging by the mobile terminal rotated by 90 degrees may be displayed.

In step S908, the main controller 303 instructs the four-side information analysis unit 309 to analyze the four-side information obtained in step S902 so as to determine a guide display direction. As a result of the guide display direction determination process performed by the four-side information analysis unit 309, when it is determined that vertical guide lines are to be displayed, the process proceeds to step S909, and otherwise, the process proceeds to step S910.

In step S909, the main controller 303 causes the guide UI instruction unit 311 to generate a rendering instruction for displaying the vertical guide lines and display the display guides as illustrated in the vertical lines 502 and 503 of FIG. 5 through the information display unit 304 in the live-view screen in an overlapping manner, and thereafter, the process proceeds to step S901.

In step S910, the main controller 303 causes the guide UI instruction unit 311 to generate a rendering instruction for displaying the horizontal guide lines and display the display guides as illustrated the horizontal lines 602 and 603 of FIG. 6 through the information display unit 304 in the live-view screen in an overlapping manner, and thereafter, the process proceeds to step S901.

According to the second embodiment, a guide UI which is easily recognized by the user may be displayed for imaging of a subject image of high resolution.

Other Embodiments

Although the imaging guides of the vertical lines (502 and 503) or the imaging guides of the horizontal lines (602 and 603) are displayed in the overlapping manner in the portions in the vicinity of the left and right ends or the portions in the vicinity of the upper and lower ends in the region where the captured image is displayed in the first and second embodiments, the present disclosure is not limited to this.

For example in a case where the region where the captured image is displayed is smaller than a screen size of the mobile terminal, the imaging guides may be displayed in an emphasis manner in positions immediately outside the left and right ends or positions immediately outside the upper and lower ends in the region where the captured image is displayed.

Furthermore, the imaging guides are not limited to straight lines as long as the user may determine whether the subject image is to match the left and right ends or the upper and lower ends of the region where the captured image is displayed. For example, in the display guides illustrated in FIGS. 5 and 6, the vertical lines (502 and 503) and the horizontal lines (602 and 603) may not be displayed but arrow marks may be displayed.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-216670 filed Nov. 9, 2017, which is hereby incorporated by reference herein in its entirety.

What is claimed is:

1. An apparatus comprising:
a memory that stores a program; and
a processor that executes the program that causes the apparatus to:
detect four-side information indicating four sides of a subject image included in a captured image;
determine, based on a width and a height of the captured image and the four-side information of the subject image, whether vertical guide lines are to be displayed as imaging guides or horizontal guide lines are to be displayed as imaging guides;
display the vertical guide lines in a left end and a right end of a region in which the captured image is displayed when it is determined that the vertical guide lines are to be displayed, wherein the horizontal guide lines are not displayed when it is determined that the vertical guide lines are to be displayed; and display the horizontal guide lines in an upper end and a lower end of the region in which the captured image is displayed when it is determined that the horizontal guide lines are to be displayed, wherein the vertical guide lines are not displayed when it is determined that the horizontal guide lines are to be displayed.

2. The apparatus according to claim 1,
wherein the processor executes the program that causes the apparatus to:
display the vertical guide lines in the left end and the right end of the region in which the captured image is displayed and further display a left side and a right side of the subject image included in the captured image in an emphasis manner, when it is determined that the vertical guide lines are to be displayed; and
display the horizontal guide lines in the upper end and the lower end of the region in which the captured image is displayed and further display an upper side and a lower side of the subject image included in the captured image in an emphasis manner, when it is determined that the horizontal guide lines are to be displayed.

3. The apparatus according to claim 1,
wherein the processor executes the program that causes the apparatus to:
further display arrow marks that prompt a user to match a left side and a right side of the subject image included in the captured image with the vertical guide lines displayed in the left end and the right end of the region in which the captured image is displayed, when it is determined that the vertical guide lines are to be displayed, and
further display arrow marks that prompt the user to match an upper side and a lower side of the subject image included in the captured image with the horizontal guide lines displayed in the upper end and the lower end of the region in which the captured image is displayed, when it is determined that the horizontal guide lines are to be displayed.

4. The apparatus according to claim 1,
wherein the vertical guide lines are displayed in positions inside the region in which the captured image is displayed by a predetermined distance from the left end and the right end of the region, and
wherein the horizontal guide lines are displayed in positions inside the region in which the captured image is displayed by a predetermined distance from the upper end and the lower end of the region.

5. The apparatus according to claim 1,
wherein the vertical guide lines are displayed in positions outside the left end and the right end of the region in which the captured image is displayed, and
wherein the horizontal guide lines are displayed in positions outside the upper end and the lower end of the region in which the captured image is displayed.

6. The apparatus according to claim 1,
wherein the vertical guide lines and the horizontal guide lines are displayed by solid lines, broken lines, or dotted lines.

7. The apparatus according to claim 1,
wherein the processor further determines whether the vertical guide lines are to be displayed or the horizontal guide lines are to be displayed by comparing an aspect ratio of the captured image with a detected aspect ratio of four sides of the subject image.

8. The apparatus according to claim 1,
wherein the processor executes the program to further perform:

determining whether an automatic imaging condition is satisfied based on the detected four-side information of the subject image; and
storing the captured image in a storage unit when it is determined that the automatic imaging condition is satisfied.

9. The apparatus according to claim 8,
wherein the vertical guide lines or the horizontal guide lines are displayed in a case where it is determined that the automatic imaging condition is not satisfied.

10. The apparatus according to claim 1,
wherein execution of program by the processor further causes the apparatus to:
determine whether a direction of the subject is appropriate based on a width and a height of the captured image and the detected four-side information of the subject image; and
display a guide prompting to rotate the subject or the apparatus when it is determined that the direction of the subject is not appropriate.

11. An apparatus comprising:
a memory that stores a program; and
a processor that executes the program and causes the apparatus to:
detect four-side information indicating four sides of the subject image included in the captured image;
determine, based on a width and a height of the captured image and the detected four-side information of the subject image, whether a first imaging guide that prompt a user to match a left side and a right side of a subject image included in a captured image with a left end and a right end of the captured image is to be displayed or a second imaging guide that prompt the user to match an upper side and a lower side of the subject image included in the captured image with an upper end and a lower end of the captured image is to be displayed;
display the first imaging guide when it is determined that the first imaging guide is to be displayed, wherein the second imaging guide is not displayed when it is determined that the first imaging guide is to be displayed; and
display the second imaging guide when it is determined that the second imaging guide is to be displayed, wherein the first imaging guide is not displayed when it is determined that the second imaging guide is to be displayed.

12. The apparatus according to claim 11,
wherein execution of the program by the processor causes the apparatus to display the first or second imaging guides by arrow marks.

13. A non-transitory computer readable storage medium storing a program for causing a computer to perform:
detecting four-side information indicating four sides of a subject image included in a captured image;
determining, based on a width and a height of the captured image and the four-side information of the subject image, whether vertical guide lines are to be displayed as imaging guides or second horizontal lines are to be displayed as imaging guides; and
controlling to display the vertical guide lines in a left end and a right end of a region in which the captured image is displayed when it is determined that the vertical guide lines are to be displayed, wherein the horizontal guide lines are not displayed when it is determined that the vertical guide lines are to be displayed; and controlling to display the horizontal guide lines in an upper end and a lower end of the region in which the captured image is displayed when it is determined that the horizontal guide lines are to be displayed, wherein the vertical guide lines are not displayed when it is determined that the horizontal guide lines are to be displayed.

14. A non-transitory computer readable storage medium storing a program for causing a computer to perform:
   detecting four-side information indicating four sides of the subject image included in the captured image;
   determining, based on a width and a height of the captured image and the detected four-side information of the subject image, whether a first imaging guide that prompt a user to match a left side and a right side of a subject image included in a captured image with a left end and a right end of the captured image is to be displayed or a second imaging guide that prompt the user to match an upper side and a lower side of the subject image included in the captured image with an upper end and a lower end of the captured image is to be displayed;
   controlling to display the first imaging guide when it is determined that the first imaging guide is to be displayed, wherein the second imaging guide is not displayed when it is determined that the first imaging guide is to be displayed; and
   controlling to display the second imaging guide when it is determined that the second imaging guide is to be displayed, wherein the first imaging guide is not displayed when it is determined that the second imaging guide is to be displayed.

15. An information processing method executed by an information processing apparatus, the information processing method comprising:
   detecting four-side information indicating four sides of a subject image included in a captured image;
   determining, based on a width and a height of the captured image and the four-side information of the subject image, whether vertical guide lines are to be displayed as imaging guides or horizontal guide lines are to be displayed as imaging guides;
   displaying, when it is determined that the vertical guide lines are to be displayed, the vertical guide lines in a left end and a right end of a region in which the captured image is displayed, wherein the horizontal guide lines are not displayed when it is determined that the vertical guide lines are to be displayed; and
   displaying, when it is determined that the horizontal guide lines are to be displayed, the horizontal guide lines in an upper end and a lower end of the region in which the captured image is displayed, wherein the vertical guide lines are not displayed when it is determined that the horizontal guide lines are to be displayed.

16. An information processing method executed by an information processing apparatus, the information processing method comprising:
   detecting four-side information indicating four sides of the subject image included in the captured image;
   determining, based on a width and a height of the captured image and the detected four-side information of the subject image, whether a first imaging guide that prompt a user to match a left side and a right side of a subject image included in a captured image with a left end and a right end of the captured image is to be displayed or a second imaging that prompt the user to match an upper side and a lower side of the subject image included in the captured image with an upper end and a lower end of the captured image is to be displayed;
   displaying the first imaging guide when it is determined that the first imaging guide is to be displayed, wherein the second imaging guide is not displayed when it is determined that the first imaging guide is to be displayed; and
   displaying the second imaging guide when it is determined that the second imaging guide is to be displayed, wherein the first imaging guide is not displayed when it is determined that the second imaging guide is to be displayed.

* * * * *